United States Patent [19]

Kolacny

[11] 4,249,179
[45] Feb. 3, 1981

[54] CIRCUIT ARRANGEMENT FOR DISPLACING THE CLUTTER SPECTRUM IN A RADAR RECEIVER

[75] Inventor: Peter Kolacny, Unterpfaffenhofen, Fed. Rep. of Germany

[73] Assignee: Siemens Aktiengesellschaft, Berlin & Munich, Fed. Rep. of Germany

[21] Appl. No.: 927,283

[22] Filed: Jul. 24, 1978

[30] Foreign Application Priority Data

Aug. 29, 1977 [DE] Fed. Rep. of Germany ....... 2738832

[51] Int. Cl.³ .......................... G01S 7/28; G01S 13/52
[52] U.S. Cl. ..................................... 343/7 A; 343/7.7
[58] Field of Search .................................. 343/7 A, 7.7

[56] References Cited

U.S. PATENT DOCUMENTS

| 3,742,500 | 6/1973 | Freedman | 343/7.7 |
| 3,962,704 | 6/1976 | Evans | 343/7.7 |
| 4,042,924 | 8/1977 | Evans et al. | 343/7 A |
| 4,093,949 | 6/1978 | Evans | 343/7 A |
| 4,132,990 | 1/1979 | Di Domizio et al. | 343/7.7 X |
| 4,137,533 | 1/1979 | Briechle et al. | 343/7.7 |

FOREIGN PATENT DOCUMENTS 1380040  1/1975  United Kingdom ..................... 343/7.7

OTHER PUBLICATIONS

R. Voles, Effects of Noise in Clutter-Locking MTI Systems, Proc. IEE, vol. 122, No. 7, Jul. 1975, pp. 689-692.
R. Voles, Losses Due to the Error in Estimating the Velocity in Clutter-Locking MTI Systems, IEEE Trans. on Aerospace & Electronics, Nov. 1973, pp. 950-953.
V. G. Hansen et al.; Adaptive Digital MTI Signal Processing, IEEE Eascon Conference Record, Sep. 1973, pp. 170-176.
R. Roy et al., Velocity Adaptive MTI Filter, IEEE Trans. on Aerospace and Electronic Systems, Mar. 1973, pp. 324-326.

Primary Examiner—T. H. Tubbesing
Attorney, Agent, or Firm—Hill, Van Santen, Steadman, Chiara & Simpson

[57] ABSTRACT

A circuit for a pulse Doppler radar receiver in which a measuring signal for determining the mean frequency of disturbing low frequency received clutter signals is obtained from which there is determined a control signal for operating a circuit that precedes the clutter filter and serves to displace the clutter spectrum into the blocking ranges of the fixed clutter filter particularly for radar devices having a non-constantly scanning antenna and wherein the circuit for determining the mean change in the clutter phase is in parallel with a delay device which has a delay that extends over a number of radar periods and wherein the circuit for determining the mean change in the clutter phase is preceded by an adjustable phase shift device which is followed by an accumulator for the addition of phase change and wherein continuous adjustment of an adjustable phase shift device is accomplished with a return loop and in which a switch is provided between the circuit for determining the mean change in the clutter phase and the accumulator which is closed at the end of each radar period for the transmission of measuring values.

2 Claims, 8 Drawing Figures

FIG 1

FIG 2 a) Eq. (1), (2)
b) Eq. (3)
b1) Initial Phase $\varphi_1 = n \cdot \pi/2$
b2) Initial Phase $\varphi_1 = n \cdot \pi/2 + \pi/4$
b3) Initial Phase between 0 and $2\pi$
    $[e_1] = [e_2] = 1$

CIRCUIT ARRANGEMENT FOR DISPLACING THE CLUTTER SPECTRUM IN A RADAR RECEIVER

BACKGROUND OF THE INVENTION

1. Field of the Invention

This invention relates in general to circuit arrangements for pulse Doppler radar receivers and in particular to a novel circuit. The invention relates to a circuit arrangement for a receiver of a pulse Doppler radar wherein a measuring signal for determining the mean frequency of disturbing low frequency received clutter signals are obtained from which a control signal is formed for a circuit which precedes the clutter filter and which serves to displace the clutter spectrum into the blocking ranges of the fixed clutter filter particularly for radar devices having a non-constantly scanning antenna and wherein a circuit is provided for determining the mean change in the clutter phase of consecutive radar periods from which the control signal for the displacement of the clutter spectrum is formed.

2. Description of the Prior Art

Prior art devices provide time placement delays for the clutter spectra, for example, due to a slow movement of the vehicle which carries the radar device or due to differing conditions in the relevant directions of an antenna during scanning. If counter measures are not taken, such displacements in the clutter spectrum give rise to an increase in disturbing received signals in the pass range of the moving target clutter filter. For this reason, processes have been developed which allow an adaptive displacement of the time-variant clutter spectrum to be effective relative to the blocking range of a clutter filter. Examples are disclosed in the article by Voles in Proceedings of the IEE, Vol. 122, No. 7 of July, 1975 at pages 689–692 and in the IEEE Transactions AES, of November, 1973 at pages 950–953.

An adaptive displacement of these types of the time-variant clutter spectrum, has the advantage that no mean error occurs in the determination of the phase difference required for the displacement between two received clutter echoes and there is no dependence of the variance of the error upon the mean clutter frequency.

The disadvantages of these prior art known regulating processes is that "build-up processes" occur which are likely when, for example, a scanning process commences or when a non-constant scanning of the area by the radar antenna takes place in the so-called step-scan operation. Non-constant space scanning of this type occurs in particular when phase control radar antenna are used. The first pulses cannot be used for analysis and are lost.

The adaptive regulation process described in the publication IEEE Eascon Conference Record, Washington, D.C. September, 1973 at pages 170–176 describes operation with a constant all-around antenna which has this disadvantage of the build-up process, in other words, the time until full sensitivity is reached can comprise up to ten radar periods and the associated pulse echo signals are lost in this analysis.

The article IEEE Transactions on Aerospace and Electronic Systems AES-9, Vol. 2, March, 1973 discloses adaptive filters for a clutter suppression. The parameters in this article which modify the filter characteristics are varied depending upon the clutter spectrum in a manner such that these undesired signals are suppressed. As this necessitates a squaring of the clutter signals and occupies a specific length of time, delay devices which compensate for this time delay are provided in the signal transmission path. The use of adaptive filters is only possible with a viable outlay if these filters are of simple construction as only then will a few parameters need to be modified. A displace of the clutter spectrum is advantageous in comparison to an adaptive filter because no change is necessary in filter parameters and, therefore, it is possible to use high grade moving target filters of a correspondingly complicated construction.

SUMMARY OF THE INVENTION

The present invention which relates to a circuit arrangement discussed above, is based on the object of undertaking the displacement of the time-variant clutter spectrum in the blocking range of the clutter filters in a manner such that echo signals are no longer lost from the analysis and also it is possible to carry out as accurate as possible detection of the mean clutter phase change. According to the invention, this is achieved in that the circuit for determining the mean change in the clutter phase is arranged in parallel with the delay device which has a delay equivalent to a plurality of radar periods and the circuit for determining the mean change in the clutter phase is preceded by an adjustable phase shift device and is followed by an accumulator for adding the phase change and wherein a continuous adjustment of the adjustable phase shift device is accomplished by way of a return loop. Between the circuit for determining the mean change in the clutter phase and the accumulator, a switch is arranged which is closed at the end of each radar period for the transmission of the measured value.

The circuit of the invention obtains the control signal for the circuit for displacing the clutter spectrum without losing any of the echos signals within the scope of a long duration "build-up process" and all elements of information concerning the clutter phase change become increasingly accurate due to the return loop and the adjustable phase shift device.

According to a further development of the invention, the desired echo signals of real genuine targets are not included in the regulating process particularly when the signals from a wide range zone in which the influence of the clutter signals outweigh that of genuine moving target signals are used for the displacement of the clutter spectrum. On the other hand, the subsequent separation of clutter signals and the genuine target echo signal during analysis is accomplished in comparatively extremely narrow range gates (range channels) where the influence produced by the genuine echo target signals is much greater percentage-wise.

The circuit according to the invention can be used in the high frequency position or video position of the radar receiver. In addition to lower cost outlay, use in the video position also has the particular advantage that the circuit according to the invention can also easily be subsequently inserted, for example, as an assembly into an existing radar device. The circuit can also be constructed very simply in a digital fashion.

Other objects, features and advantages of the invention will be readily apparent from the following description of certain preferred embodiments thereof, taken in conjunction with the accompanying drawings although variations and modifications may be effected

DESCRIPTION OF THE PREFERRED EMBODIMENTS

Figure 1:
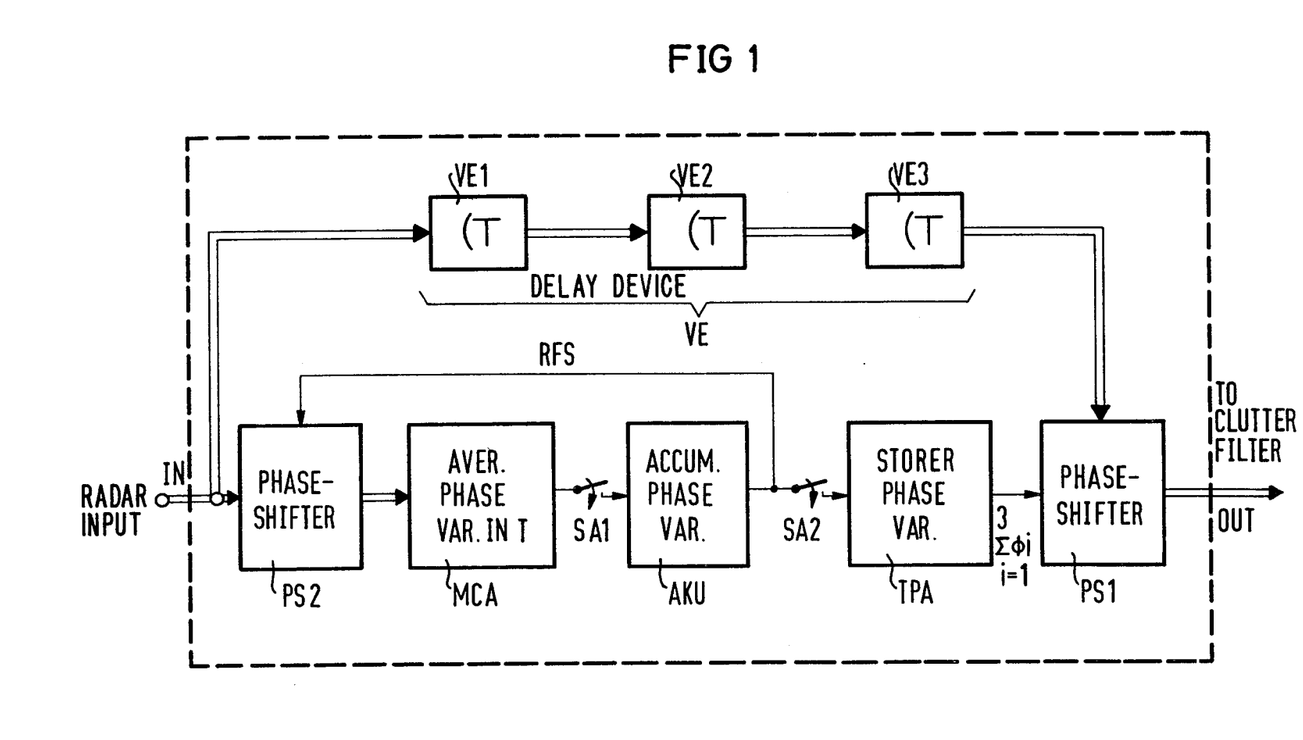
FIG. 1 is a block diagram illustrating the invention.

The invention is illustrated in FIG. 1 in block diagram form and an input terminal IN receives the input of the pulse-Doppler radar receiver. In the present invention, for exemplary purposes, the signal processing is carried out in digital form, in other words, the radar echo signals are already in digital form at the input terminal IN and the subsequent elements may be of digital design. In those equipment in which the video signals are transmitted in complex form, in other words, both in sinusoidal and in cosinusoidal channels for purposes of phase quadrature, the corresponding transmission channels are illustrated in double lines. The complex video signal is passed through a delay device designated VE which in the specific example comprises three delay devices in series which are designated, VE1, VE2 and VE3. Each of these three delay elements delay the received signals for a time duration of T of one radar period. Thus, in the present example, the overall delay amounts to 3T. At the output of the delay device VE is a phase shifter device PS1 for displacing the clutter spectrum. The phase shift device PS1 is preferably designed as a complex digital multiplier which fulfills the function of $e^{-ja} \cdot e^{-jb}$. The output terminal OUT of the phase shifter PS1 is supplied to an analyzing circuit not shown in FIG. 1 which is in turn followed by the moving target filter (clutter filter) for suppressing fixed target signals of no interest and low frequency Doppler frequency ranges and for the transmission only of those Doppler frequencies which are of interest (of a higher frequency). Such clutter filters have poles at multiples of the pulse repetition frequency and are permanently tuned, in other words, they are not normally tuned during operation.

As the relevant clutter frequency changes in a time dependent fashion in a non-predictable manner as, for example, during the scanning of a new range and in particular in the case of a non-constant scanning of the space by a radar antenna, the phase shift device PS1 must be provided with a control signal for varying its amount of phase shift which constantly compensates for the changes in the clutter frequency spectrum in such a manner that as little as possible energy of the clutter signals fall into the pass band range of the clutter filters. For this purpose, a separate regulating loop is provided which branches off a part of the input signal before it is received by the delay device VE. Such circuit contains a phase shifter PS2 which is connected to the input terminal IN and which might preferably be a complex digital multiplier. The output of the phase shifter PS2 is supplied to a circuit for determining the mean clutter phase change MCA which supplies its output to a switch SA1. An accumulator AKU receives the output of the switch SA1 when it is in the closed position and supplies its output to a switch SA2. A storer TPA is connected to the switch SA2 and receives the output of the accumulator AKU when the switch SA2 is closed, and the storer's output is supplied to the phase shifter PS1 as the phase shift control signal. The storer TPA supplies the control signal for the phase shift device PS1 and, thus, for displacing the clutter frequency spectrum to the desired position. A return feed loop RFS is connected from the output of the accumulator AKU to the phase shifter PS2 to control the phase of the phase shifter PS2.

At initiation of the scanning process, no received signals arrive at the phase shift device PS1 for the duration of the first three radar periods because of the delay time of the delay device VE which amounts to a total of 3T. During this time, the value of the mean clutter frequency must be determined sufficiently accurately. During the first radar period of a scanning process, the phase of the shift device PS2 at the input of the regulating loop has an initial position which corresponds to a mean value. In the measuring circuit MCA, the mean clutter phase change is determined from radar period to radar period. For this purpose, a plurality of very coarsely graded range zones are provided in which the phase change of the clutter is continuously determined from radar period to radar period. The greater this measured value the greater must be the phase shift and, thus, the shift in the clutter spectrum in the phase shifter PS1. The width of the range zones in the circuit MCA must be selected to be sufficiently great to allow the measurement of a zone which is homogeneous in respect to the clutter. Under no circumstances may these range zones (as for example five) be selected to be so narrow as the actual range channels (as for example one hundred) which serve to detect moving targets in the analyzing circuit of the radar device because the danger exists that a genuine moving target will be confused and identified as "clutter".

The relevant clutter phase changes are determined from period to period for each range zone or at least for a part of the range zones and a mean value is subsequently determined.

As a result of the closure of the switch SA1 at the end of the radar period, the measured value for the mean clutter phase change is fed from circuit MCA to the accumulator AKU where such value is stored. The phase information obtained in this manner in the accumulator AKU is provided by way of the return loop RFS as the setting for the phase shift device PS2. As a result, this phase shift device PS2 is adjusted and at the beginning of the next (second) radar period T2, a first correction value will already be set into the phase shift device PS2. As a result, the mean clutter phase change determined in the measuring circuit MCA will already be considerably smaller during the period of the second radar period T2 than during the first measuring which was accomplished during the first radar period T1. The remaining measured value for the mean clutter phase change which existed at the end of T2 is fed to the accumulator AKU as a result of the closure of the switch SA1 and this signal corrects the phase change measured value which was already available from the first measuring period. This second corrected measured value from the accumulator AKU is fed to the phase shift device PS2 at the beginning of the third scanning period T3 so that the measurement within the third radar period T3 in the measuring circuit MCA must produce a smaller error than the measurement made during the second radar period. At the end of the third radar period T3, the switch SA1 is closed again and the measured value from the third period is likewise fed to the accumulator AKU. The return loop RFS provides the advantage that the accuracy of the measuring process is improved. The overall value of the phase change is formed iteratively by adding the three measured values in the accumulator AKU. The adaptation by the continuous adjustment by way of the return loop RFS is accomplished in real time operation for all of the relevant beam settings.

At the end of the third radar period or generally when a sufficiently accurate phase change measured value has been stored in the accumulator AKU, the switch SA2 is closed and at the commencement of subsequent radar periods as in the example, the fourth radar period T4, the correct sufficiently accurate value of the control signal for the phase shift device PS1 will be stored in the storer circuit TPA. At the beginning of the fourth radar period T4 at the output of the delay device VE3 will occur a first echo signal which is influenced by the phase shift device PS1 which is set based on the information received from the relevant clutter frequency obtained within the preceding three radar periods, in such a manner that the disturbing phase shift and thus the disturbing shift in the clutter spectrum can be substantially eliminated at the output OUT. The following permanently set clutter filters can thus filter out the clutter signals produced by, for example, cloud clutter or "CHAFF" or by self-movement due to the displacement of the clutter spectrum which takes place in the phase shifter PS1 as these interfering signals fall into the blocking ranges.

The algorithm utilized in the MCA circuits so as to determine the phase difference between two consecutive clutter signals of a range zone must produce a phase characteristic which is such that the actual phase difference is determined sufficiently accurate with the least possible recursions and accumulations.

Expressed in general terms, if the acquisition of the phase information for the control signal of the phase shift device PS1 can be accomplished with sufficient accuracy within n radar periods, the switch SA1 must be closed n-times (at the end of the relevant radar periods) within this time. Thus, the delay device VE should be designed such that an overall delay of n.T occurs preceding the phase shift device PS1. The switch SA2 is expediently not closed until after n periods where upon the setting of PS1 is then accomplished.

During continuous operation, the regulating circuit remains in action although the clutter phase of the relevant last three (in general terms the last n) receiving periods from the m-th beam setting of a non-constant scanning of the antenna is compensated by means of the last phase value stored in the storer TPA by means of the phase shifter PS2. At the same time, in other words, during the n first periods of the (m+1)-th beam setting, the requisite new phase values which are transferred after n periods to the storage circuit TPA are determined so that the phase shift device PS1 is already correctly set for the new received pulses of the (m+1)-th beam setting so that all of the (even the last n) received pulses of the m-th beam setting have been subject to a relevant phase shift in phase shifter PS1 and, thus, no echo signals are lost from the analysis. This is particularly important in the case of a continuous non-constant scanning of the space as in such instances time lost from the signal analysis at the beginning and/or end of a scanning process due to "build-up processes" are added and prolong the overall scanning process.

The circuit arrangement elements may be arranged as a compact module and packaged as shown by dash lines and can be mounted in the radar receiver.

In order to provide proper analysis, the determination of the actual phase difference between two received clutter pulses must be determined. This can be determined from the equation $$\phi \text{ act.} = \phi_2 - \phi_1 = \arctan \frac{e_{1s}}{e_{1c}} = \arctan \frac{e_{2s}}{e_{1c}} \quad (1)$$

$$\arctan \left( \frac{e_{1s}e_{2c} - e_{2s}e_{1c}}{e_{1c}e_{2c} + e_{1s}e_{2s}} \right)$$

where $e_{1c}$ or $e_{1s}$ and $e_{2c}$ or $e_{2s}$ are the real or the imaginary components respectively of the first and second received pulses having the respective phases of $\phi_1$ and $\phi_2$. If apparatus is provided for solving equation 1, then the phase difference measured would be equal to the actual phase difference and $$\phi_{\text{measured}} = \phi_{\text{actual}} \quad (2)$$

Equation 2 represents the ideal phase characteristic comprising a straight line with positive slope. In this instance, a single regulating or control loop would be sufficient to determine the phase difference required for the solving of the problem.

The utilization of equation 1 for determining the phase difference however gives rise to considerable difficulties.

1. Ambiguity

In the case of arc tangent functions, a clear determination between angular values and function values is possible only for angular values $< |\pi/2|$.

In X-band operation with Range=30 km range, the phase displacement of the cloud cutter has values up to $|\pi|$ depending upon wind velocity. In this case, it is possible to solve for function values in equation 1 at two different angular values one of which would be a false value and one of which is a correct value such that additional criteria for obtaining the unambiguous measurement of $\phi$ would have to be utilized.

2. Infinity Locations

So as to avoid the locations of infinity of the tangent functions at $|\pi/2|$, the tangent functions would have to be replaced in the range of $|\pi/4|$ to $|3\pi/4|$ by the cotangent function and an additional decision is required as to whether the tangent or the cotangent function is to be used.

3. Outlay

So as to realize in a practical embodiment a device for solving equation 1 in addition to the decision logic of the tangent and cotangent and the unambiguous criteria, in order to solve equation 1 requires 4 multipliers, 2 adders, 1 divider, 1 ROM (read only memory) which stores the arc tangent and the arc cotangent functions as well as the addressing logic required for the call-up of stored information.

So as to reduce the outlay connected with the exact solving of equation 1 in the following a method for approximation is examined. To make an approximate solution, there remains after the first recursion, a norm deviation which is reduced with each subsequent recursion. This deviation is manifested in a loss improvement factor. Thus, for the determination of the actual phase displacement, a plurality of recursions are required as a consequence of which a build-up process exists.

In an all around or ground surveillance or circular operation, the build-up problem is not as significant as in the case of a step-scan-operation of an electronically operated antenna. In the first instance, a build-up operation occurs only at the moment of switching the system on or when there is an abrupt change in the wind speed, respectively. In principle, every characteristic can be solved for which has a positive slope through the point $\phi$ measured and $\phi$ actual $= 0$. In the case of the step-scan operation, a build-up operation would occur in every antenna position. It is therefore, necessary to employ an approximation technique which produces negligible phase error with as few received pulses as possible. Not only is the storage cost in the sin and cosine channel thereby minimized, but also the minimum time delay in the analysis and evaluation and the minimum necessary receives pulse numbers results.

Based on the characteristic discussed in the article IEEE Eascon Conference Record September 1973, at pages 170–176, the following algorithm for determining the phase difference between two received pulses is utilized.

estimated error is on the average so small that the losses in improvement factor become negligibly small.

The regulating or control loop is the heart of the clutter adaptive module and must function in on-line operation.

The phase differences measured in a moving window between two consecutive received pulses are averaged. The mean phase displacement is thus determined for every range gate and is accumulated to the value determined during the preceding recursion in the same range gate. The phase accumulated for each range gate is utilized during the next recursion for the purpose of phase correction which is accomplished with the phase shifter PS2 illustrated in FIG. 1 in the respective range gate. Thus, with each recursion, a measurement of the phase difference between two consecutively received pulses n and n+1 from a range gate and a phase correction or phase shift of the (n+1)-th received pulse alternate with one another in the range gate clock time $\tau$ until the entire range zone has been received. After $N'=3$ recursions, the phase values accumulated for each range gate are stored and are available for computation. With each new antenna position, the accumulator AKU is reset.

Figure 3:
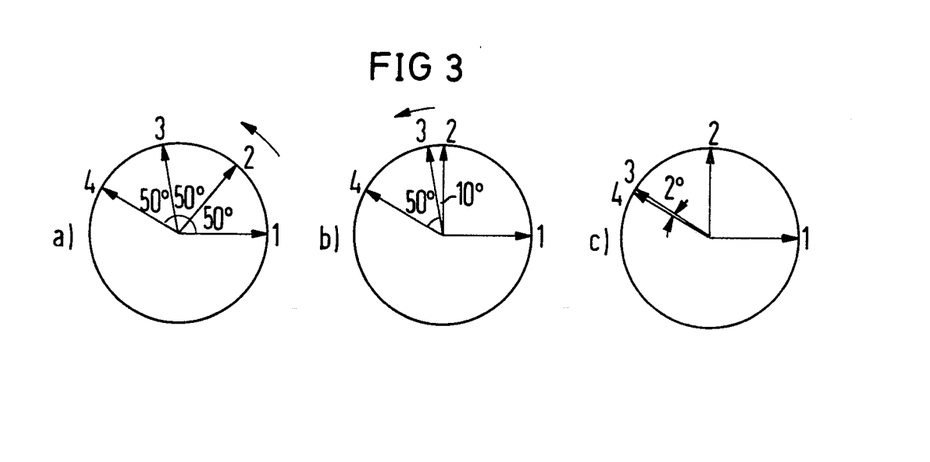
FIG. 3 comprises three phase diagrams.

The method of operation of the regulating or control loop is illustrated by the phase graphs illustrated in FIG. 3. The phase vectors rotate at the received frequency and represent the first four received pulses from one direction for one range gate during the regulating or control operation. FIG. 3$a$ illustrates the phase relationship prior to regulation or control. The first mea- $$\phi_{measured} = \frac{\pi}{4}\left\{\left[\text{SIGN}\left(\frac{e_{1s}}{|e_1|} + \frac{e_{2s}}{|e_2|}\right)\right]\left(\frac{e_{2c}}{|e_2|} - \frac{e_{1c}}{|e_1|}\right) + \left[\text{SIGN}\left(\frac{e_{1c}}{|e_1|} + \frac{e_{2c}}{|e_2|}\right)\right]\left(\frac{e_{1s}}{|e_1|} - \frac{e_{2s}}{|e_2|}\right)\right\} \quad (3)$$

where $|e_1|$ or $|e_2|$ are the values of the clutter amplitudes of the first or the second received pulses, respectively.

Figure 5:
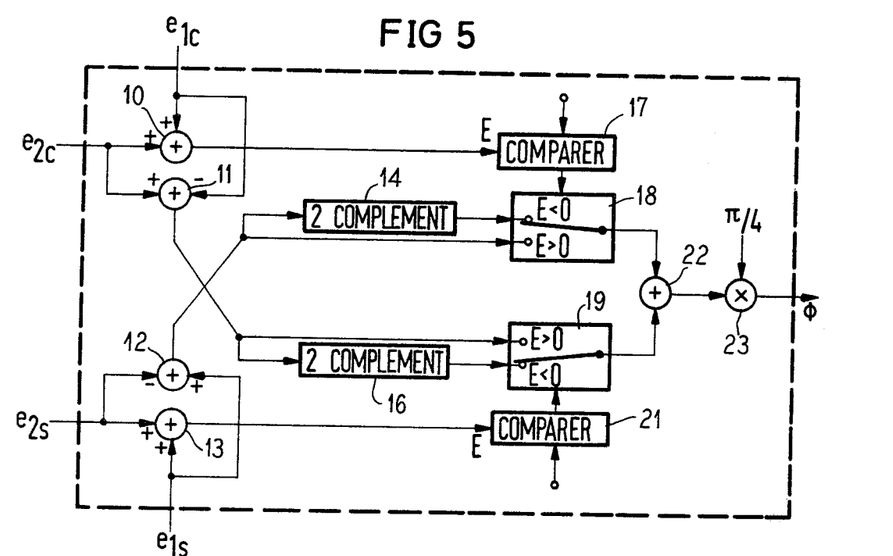
FIG. 5 is a block diagram illustrating the circuits for combining the clutter amplitude signals to determine the phase difference between two received pulses.

FIG. 5 illustrates specific details of the circuit for solving equation 3.

Equation 3 represents an odd function periodic with $2\pi$, whose main value lies in the range of $-\pi \leq \phi_{act.} \leq +\pi$. By standardization or scaling to the clutter amplitudes $|e_1|$ and $|e_2|$, the measured phase difference becomes independent of the clutter intensity, since $|e_2|$ follows $|e_1|$ by a time delay of T equal to the pulse period, $|e_1| = |e_2|$.

Figure 2:
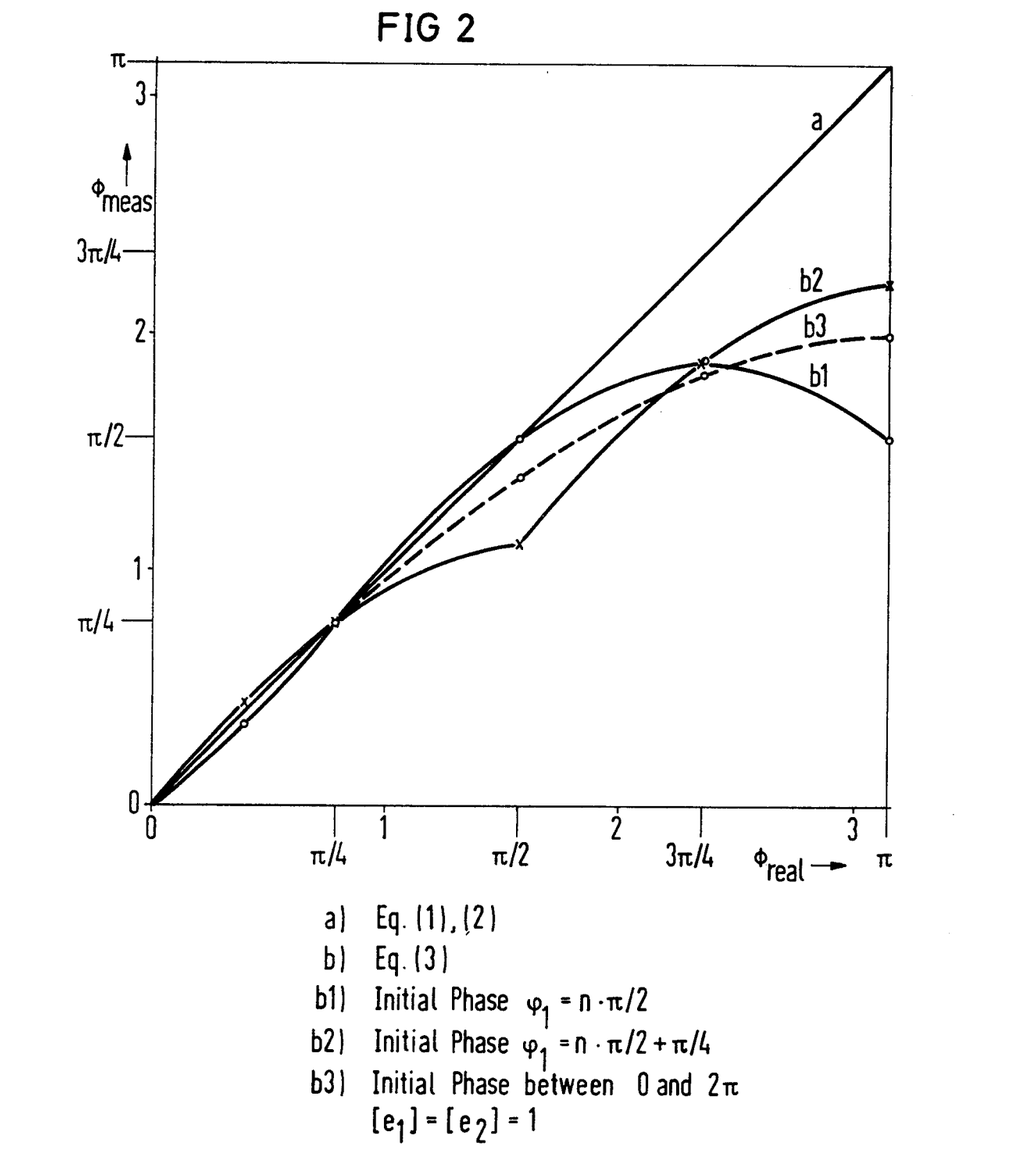
FIG. 2 is a graph illustrating the principles of the invention.

FIG. 2 illustrates the relationship between the measured and the actual phase difference between two clutter pulses in the range of 0 to $\pi$ according to equation 3 for different initial phases $\phi_1$ of the first received pulse. In this graph, it was assumed that the clutter amplitude is equal to 1. Additionally, there is illustrated the characteristic averaged over all possible $\phi_1$. $\phi$ measured in the mean or average is equal to $$\int_0^{2\pi} p(\phi_1) \cdot \phi \text{ measured } (\phi_1) \, d\phi_1 = \quad (4)$$

$$2\text{SIN}\left(\frac{\phi_{actual}}{2}\right) ; p(\phi_1) = \frac{1}{2\pi}$$

The interval between this characteristic and the characteristic for the exact algorithm indicates the mean norm deviation and serves as the input quantity or value for the next calculation. After three calculations, the sured result is $\overline{\phi}_{21} = 40° = \overline{\phi}_1$;

$$\sum_{i=1}^{1} \phi_i = 40°.$$

FIG. 3$b$ illustrates the situation when the first phase correction is made and the second measured result is $\overline{\phi}_{32} = 8° = \overline{\phi}_2$;

$$\sum_{i=1}^{2} \phi_i = 48°.$$

FIG. 3$c$ illustrates the indicated position following the second phase correction. The third measurement results in $\overline{\phi}_{43} - 1.99° = \overline{\phi}_3$;

$$\sum_{i=1}^{3} \phi_i = 49.99° \approx \phi_{act}.$$

Figure 4:
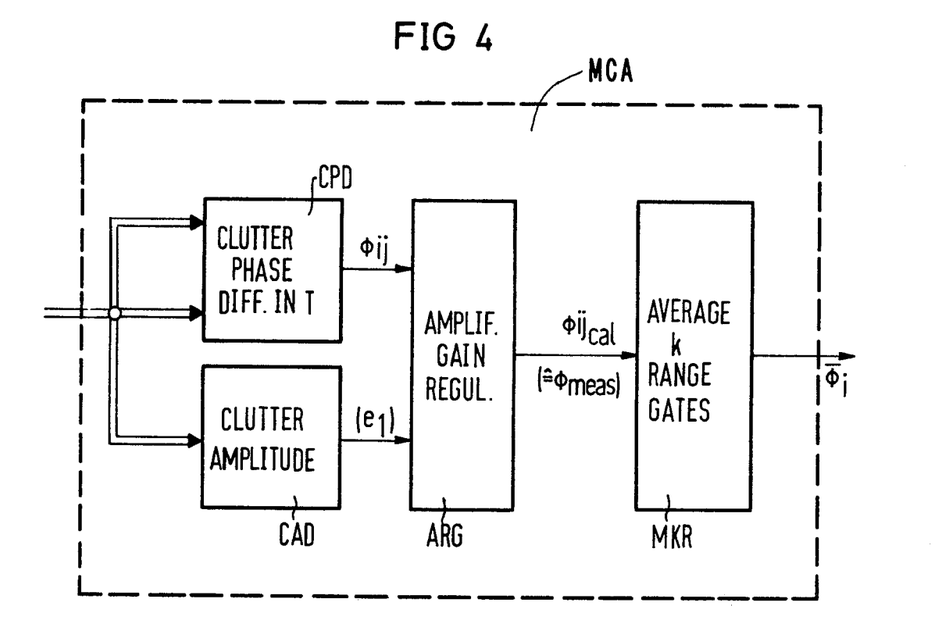
FIG. 4 is a block diagram of the circuit for determining the mean phase of displacement between two received pulses.

FIG. 4 is the block circuit diagram for determining the mean phase displacement $\overline{\phi}_i$ between two received pulses. The algorithm utilized in the circuit CPD, the clutter phase difference for determining the phase displacement of the clutter necessitates as can be observed from equation 3 a gain control in the circuit ARG which is the amplifier gain regulator because of the relationship between the measured phase displacement upon the amplitude of the clutter. For a gain control, the determination of the clutter amplitude is determined in the clutter amplitude circuit CAD which provides an amplitude gain control signal to the amplifier gain regulator ARG. The output of the amplifier gain regulator circuit ARG is supplied to the average range gates circuit MKR wherein the average or mean phase variations signal is formed from the clutter phase difference determined and regulated over k range gates.

FIG. 5 illustrates the hardware for solving equation 3 without scaling to the clutter amplitude $|e_1|$. The signals $e_{1c}$, $e_{2c}$, $e_{2s}$ and $e_{1s}$ are respectively combined in the adders 10, 11, 12 and 13 connected as shown and the output of the adders 11 and 12 are respectively provided to the two complement circuits 14 and 16 respectively. The comparator 17 receives the output of the adder 10 and the comparator 21 receives the output of the adder 13. Switches 18 and 19 have moveable contacts which are connected to either to the outputs of the two compliment circuits 14 and 16 or respectively to the outputs of the adder circuits 12 and 11. The moveable contacts of the switches 18 and 19 are connected to the adder 22 which provides an output to the multiplier 23 which produces the phase shift between two received clutter pulses. So as to realize in a digital simple manner the multiplication with the factor of $\pi/4 = 0.785398\ldots$, such multiplication can be reduced by way of approximation to a few displacements and additions of a few terms. The standardization to the clutter amplitude or to the clutter noise power ratio C/N respectively of the received pulse is accomplished by means of a gain control.

For gain control, the knowledge of the absolute value of the complex received signal is required and approximations such as illustrated in IEEE Transactions AES of January, 1976 can be utilized.

$$|e_1| \approx \begin{cases} x & e_{1s} \leq 0.25 e_{1c} \\ 7/8 x + \tfrac{1}{2} y & e_{1s} > 0.25 e_{1c} \end{cases} \text{ for with } \begin{array}{l} x = \max(|e_{1c}|, |e_{1s}|) \\ y = \min(|e_{1c}|, |e_{1s}|) \end{array}$$

By means of this approximation, a mean error of 3% results for determining the amplitude. This results in a negligible loss in the improvement factor. The gain control must provide a standardization of the measured phase such that the measured phase for a specific dynamic range of $|e_1|_{min} \ldots |e_1|_{max}$, is independent of the amplitude $|e_1|$ of the received clutter pulse. It is to be noted that FIG. 5 is a detailed schematic view of the CPD illustrated in FIG. 4 and the output labelled $\phi$ in FIG. 5 at the right of the Figure corresponds to the output $\phi_{ij}$ at the right of the CPD in FIG. 4. The inputs $e_{1c}$, $e_{2c}$, and $e_{2s}$ and $e_{1s}$ correspond to the inputs to the CPD illustrated in FIG. 4. The two inputs to the comparators 17 and 21 in FIG. 5 receive reference signals.

Figure 6:
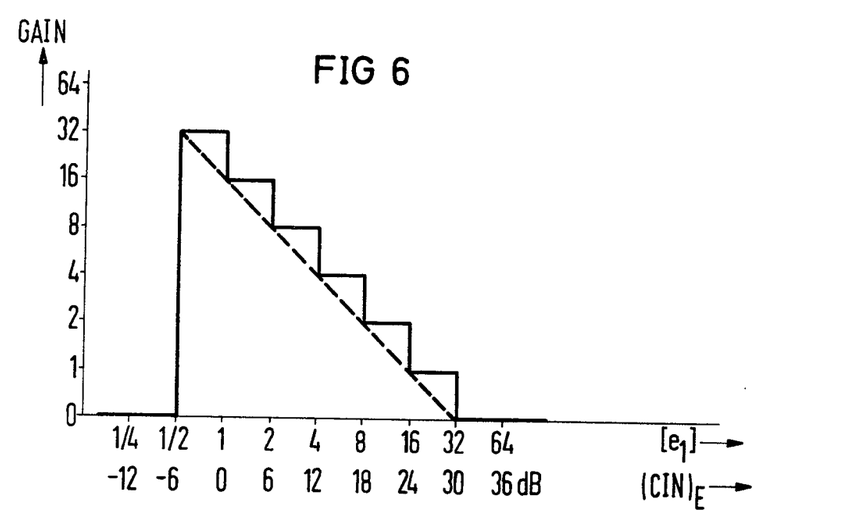
FIG. 6 is a plot of signals against gain.

FIG. 6 illustrates in broken line the analog characteristic required for this calculation and in solid line illustrates a digital approximation according to the discussion in the article IEEE of Eascon of September 1973 pages 170–176 with a 6 dB step function. This digital approximation is particularly simple because instead of using multiplication only bits displacement are required.

By assigning the gain or amplification factor $V=0$ for $|e_1| < \tfrac{1}{2}$, the measured phase difference is also set equal to zero so that an adaptation does not occur. The erroneous measurement which increases with a decreasing $|e_1|$ is prevented.

The measured and standardized clutter phase displacement between two received pulses from one range gate is associated with a straying $G^2 \phi$ measured even in the build-up stage (mean value $\mu \phi$ measured of the error equal to 0) due to the presence of white noise as well as due to the stochastic characteristic of the clutter interference. This straying or scattering can be reduced by the factor of k by means of mean value formation over k range gates. There will thus result from the mean clutter phase difference $\overline{\phi}_i$ between two received pulses as solved in FIG. 4.

Because the absolute ideal characteristic is not utilized for the purpose of determining the phase displacement so as to achieve a build-up state or condition, an accumulation of the mean phase differences $\overline{\phi}_i$ determined during three consecutive recursions is desirable. The deviation from the actual phase difference thereby becomes so small that the loss in improvement factor is negligible.

Thus, the accumulation circuit AKU shown in FIG. 1 allows the mean value of the phase error to tend toward zero on the one hand, white noise is accumulated on the other hand which causes an increase in the scattering of the error by the factor of $N'=3$ in the determination of the clutter phase. This increase can be compensated by a range gate number $$k' = k \cdot N'$$

which is greater by the factor of N' and utilized for the purposes of the mean phase difference formation.

Figure 7:
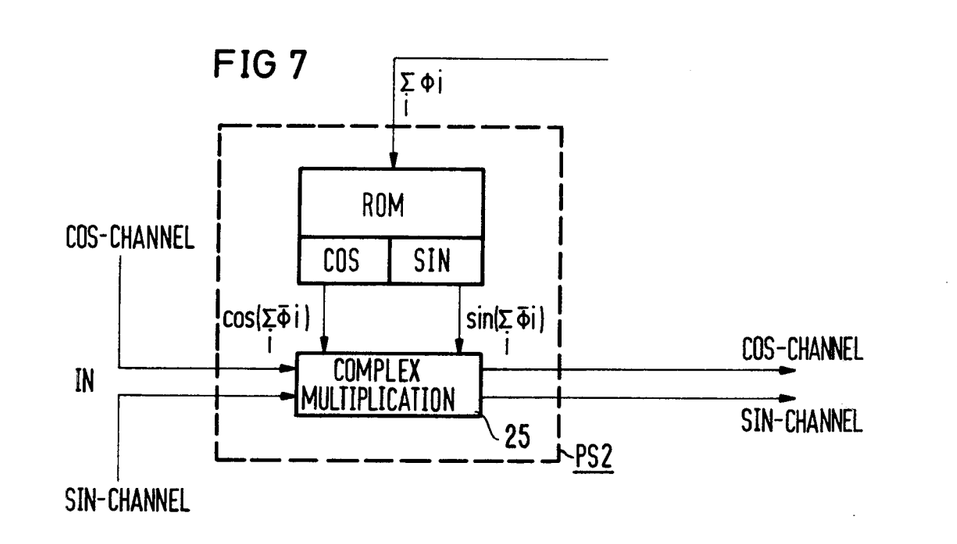
FIG. 7 is a block diagram of a sub-assembly of the invention.

In the method presented herein for each of the antenna positions only the phase of the second and third received pulses in the phase shifter PS2 of the circuit of FIG. 1 of the regulating or control loop must be rotated for each range gate. For this purpose, see the indicated diagram illustrated in FIG. 3. The rotation of the phase shifter PS1 which is illustrated in detail in FIG. 7 is effected by means of a complex multiplication 25 which is carried out in a separate manner for the real and imaginary components. Prior to the complex multiplication the Sin and the Cos values of the accumulated phases $$\sum_c \overline{\phi}_i$$

must be formed from the read only memories ROM. As illustrated in FIG. 7, the maximum possible range is $-\pi \ldots +\pi$.

Figure 8:
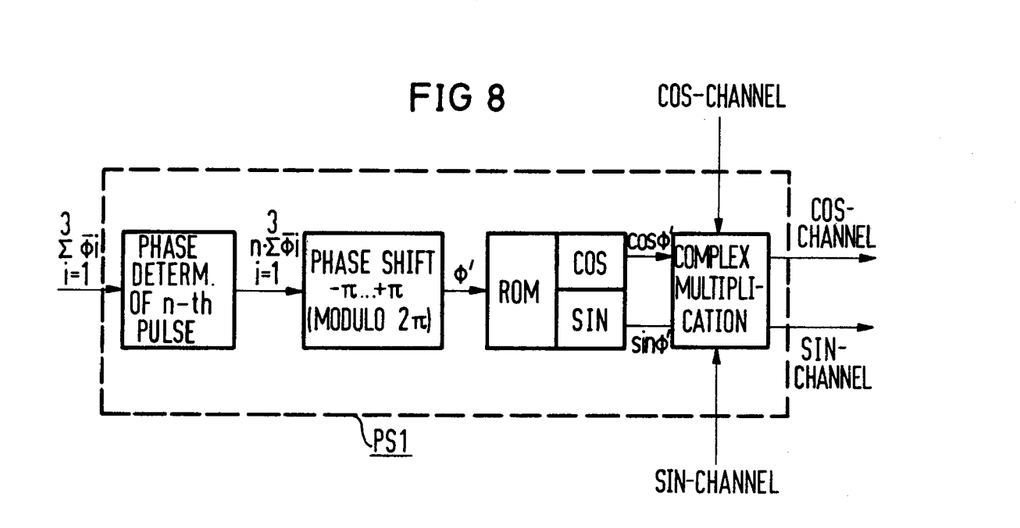
FIG. 8 illustrates a portion of the invention including the phase shifter in block form.

The displacement of the clutter spectrum toward the blocking range of a filter bank or to the blocking range of a clutter filter respectively is accomplished in the phase shifter PS1 illustrated in detail in FIG. 8 by means of a complex multiplication for each of the N received pulses $$[e^{+j(n-1)\phi_{act.}}]\left[ e^{-j(n-1)(\sum_{i=1}^{3} \overline{\phi}_i)} \right] ; n = 1, 2, \ldots N$$

where $\exp -j(n-1)\phi_{act.}$; $n = 1, 2 \ldots N$, here represents N complex clutter vectors received from an antenna position with the actual phase displacement $\phi_{act.}$ from vector to vector.

$$\sum_{i=1}^{3} \overline{\phi}_i \approx \phi_{act.}$$

is the phase difference previously determined by estimation and accumulation between two successive clutter vectors. The complex multiplication provides a rotation of the received clutter vectors such that all of them coincide. By eliminating the phase difference between the received vectors, the moved clutter (cloud clutter, chaff) is transformed into fixed clutter (ground clutter) which manifests itself in the frequency range by displacement of the spectrum. For the complex multiplication according to equation 7, the $$\text{Cos } [(n-1) \cdot (\sum_{i=1}^{3} \overline{\phi_i})] \text{ and the Sin } [(n-1) \cdot (\sum_{i=1}^{3} \overline{\phi_i})]$$

is required. The storage and the read out of a Cos or of a Sin-ROM, respectively, for the maximum possible range of $-(N-1)\pi \ldots +(N-1)\pi$ requires a large expense if a large number N of received pulses are considered. However, in utilizing the periodicity property of the Cos and of Sin functions, the above range can be transformed by means of a modulo 2 operation into the range of $-\pi \ldots +\pi$, as a consequence of which the read only memories may be designed only for this narrow range. The formation of the amount of a complex input signal in the clutter amplitude circuit CAD in FIG. 4 is described in the publication IEEE Trans. AES, January 1976, pages 86 to 89.

It is seen that this invention provides an improved circuit arrangement for displacing and removing clutter in a radar system and although it has been described with respect to preferred embodiments, it is not to be so limited as changes and modifications may be effected which are within the full intended scope as defined by the appended claims.

I claim as my invention:

1. A circuit arrangement for a receiver of a pulse-Doppler-radar with a fixed clutter filter and with a pre-connected device for the displacement of the clutter spectrum and with a circuit for the determination of the mean change of the phase to prevent interfering low frequency received clutter signals during consecutive radar periods for producing a control signal for displacement of the clutter spectrum, in particular for radar devices with a non-constantly scanning antenna, characterized in that the received clutter signals are supplied by way of two parallel circuit branches to a phase shifting device (PS1) at the output of the circuit arrangement, with one circuit branch containing the circuit for determining the mean change of the clutter phase (MCA) and which is part of a regulating loop and contains a memory (TPA) which is connected to the output of the regulating loop, and the other circuit branch contains a delay line (VE) which has a delay which extends over several (n) radar periods and the regulating loop of the first circuit branch includes in series an adjustable phase shifting device (PS2), the circuit for the determination of the mean change of the clutter phase (MCA), an accumulator (AKU) and a return loop (RFS) from the output of the accumulator (AKU) to the adjustable phase shifting device (PS2) and the circuit for the determination of the mean change of the clutter phase (MCA) and the accumulator (AKU) are connected through a switch (SA1), which is closed at the end of a radar period, and the accumulator (AKU) and the following memory (TPA) are connected through a further switch (SA2) which is closed after a number of several (n) radar periods corresponding to the delay in the delay device (VE).

2. A circuit arrangement as claimed in claim 1, wherein said circuit (MCA) for determining the mean change in the clutter phase possesses a plurality of relatively wide range zones, and the phase relationship is determined by comparing the received signals from consecutive reception periods in the same range zones, and a mean value is formed from these individual values.

* * * * *